(12) United States Patent
Fletcher

(10) Patent No.: US 8,997,414 B2
(45) Date of Patent: Apr. 7, 2015

(54) WATER TIGHT SEAL FOR CORNER JOINTS, AND ASSOCIATED MOULDINGS

(71) Applicant: Donald Joseph Fletcher, Winnipeg (CA)

(72) Inventor: Donald Joseph Fletcher, Winnipeg (CA)

(*) Notice: Subject to any disclaimer, the term of this patent is extended or adjusted under 35 U.S.C. 154(b) by 0 days.

(21) Appl. No.: 13/940,546

(22) Filed: Jul. 12, 2013

(65) Prior Publication Data

US 2014/0137496 A1     May 22, 2014

Related U.S. Application Data

(60) Provisional application No. 61/670,955, filed on Jul. 12, 2012.

(51) Int. Cl.

| | |
|---|---|
| *E04B 2/00* | (2006.01) |
| *E04F 19/04* | (2006.01) |
| *E04F 13/073* | (2006.01) |
| *E04F 13/076* | (2006.01) |
| *F16J 15/14* | (2006.01) |
| *E04F 19/02* | (2006.01) |
| *A47K 3/00* | (2006.01) |

(52) U.S. Cl.
CPC ........... *E04F 19/0486* (2013.01); *E04F 13/073* (2013.01); *E04F 13/076* (2013.01); *F16J 15/14* (2013.01); *E04F 19/02* (2013.01); *E04F 19/0459* (2013.01); *A47K 3/008* (2013.01)

(58) Field of Classification Search
USPC ........ 52/716.2, 288.1, 470, 471, 472, 718.01, 52/717.03, 717.05, 35, 254, 255, 273, 52/588.1, 287.1
See application file for complete search history.

(56) References Cited

U.S. PATENT DOCUMENTS

| | | | | |
|---|---|---|---|---|
| 2,090,588 | A | * | 8/1937 | Witsell ............................... 52/35 |
| 2,303,864 | A | * | 12/1942 | Reasor ......................... 52/716.2 |
| 3,222,837 | A | * | 12/1965 | Daley ........................... 52/287.1 |
| 3,271,232 | A | * | 9/1966 | Moore .......................... 428/130 |
| 3,667,177 | A | * | 6/1972 | Biela ............................... 52/278 |
| 4,555,885 | A | * | 12/1985 | Raymond et al. ............... 52/468 |
| 4,601,149 | A | * | 7/1986 | Dokan ......................... 52/287.1 |
| 4,760,681 | A | | 8/1988 | Harrison |
| 4,829,730 | A | * | 5/1989 | Zeilinger ..................... 52/287.1 |
| 2003/0024190 | A1 | * | 2/2003 | Stanchfield .................. 52/287.1 |

FOREIGN PATENT DOCUMENTS

| | | |
|---|---|---|
| BE | 641869 | 12/1963 |
| FR | 2724438 | 3/1996 |

* cited by examiner

*Primary Examiner* — Robert Canfield
*Assistant Examiner* — Matthew Gitlin
(74) *Attorney, Agent, or Firm* — Kyle R. Satterthwaite; Ryan W. Dupuis; Ade & Company Inc.

(57) ABSTRACT

A moulding for sealing a horizontal structure with a finishing layer of a vertical structure at a corner joint. In cross-section, the moulding has a rectangular base portion for insertion into a gap between the horizontal structure and the vertical finishing layer, and a cap portion with an upper lip for sealing against the finishing layer and a lower lip jutting downwardly for sealing against the horizontal structure. Double sided foam tape is applied only to an underside of the rectangular portion of the body. A bead of caulking at an inner face of the upper lip below an upper tip forms a flexible secondary seal of the moulding to the finishing layer of the vertical structure. While providing a secondary seal for maximum water-tightness, the caulking is protected from water exposure by the primary seal provided by the upper lip of the moulding to prevent mold build up.

18 Claims, 7 Drawing Sheets

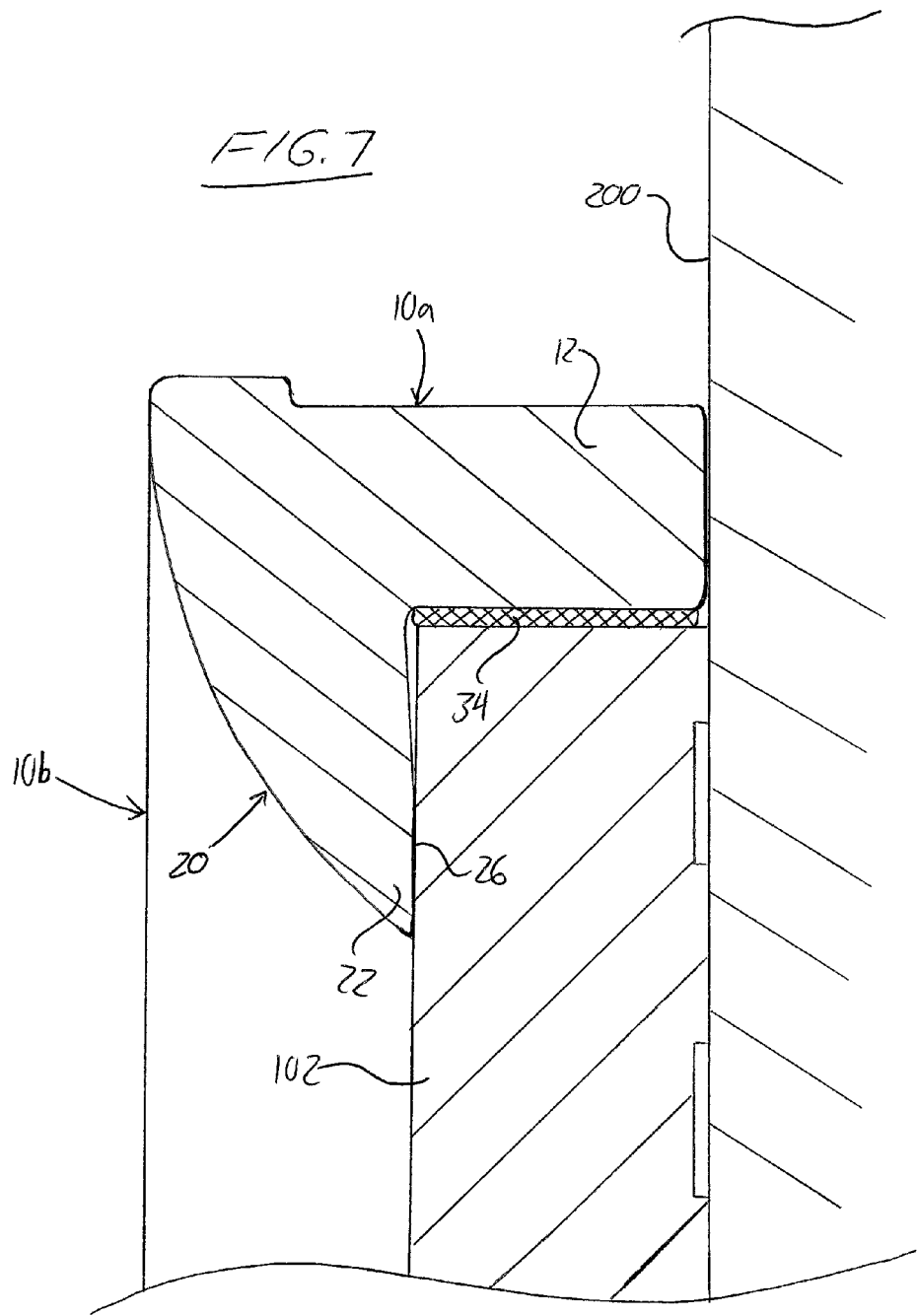

WATER TIGHT SEAL FOR CORNER JOINTS, AND ASSOCIATED MOULDINGS

CROSS REFERENCE TO RELATED APPLICATIONS

This application claims benefit under 35 U.S.C. 119 of Provisional Application Ser. No. 61/670,955, filed Jul. 12, 2012, and Canadian Patent Application 2,792,491, filed Oct. 17, 2012, each of which is incorporated herein by reference in its entirety.

FIELD OF THE INVENTION

The present invention relates generally to the formation of water tight seals between horizontal and vertical structures, such as the rim of a bathtub and the surrounding walls upstanding therefrom, and more particularly to a moulding used with caulking in such applications to provide an improved alternative to the convention use of caulking alone at such joints.

BACKGROUND OF THE INVENTION

A common problem with conventional use of caulking alone at the corner joints between a bathtub or shower stall and surrounding wall tiles is the build up of mold on the caulking over time.

Deformable mouldings have previously been proposed for use between horizontal and vertical structures, in some cases as an alternative to caulking.

U.S. Pat. No. 4,760,681 illustrated a flexible molding having a somewhat similar shape to that of the present invention in FIGS. 3 and 4 of the reference, but is configured for installation between a laminate backsplash and countertop during assembly thereof. Double sided foam tape is used atop and beneath the moulding to attach it to the surface of the countertop and the underside of the laminated backsplash board. Accordingly, the moulding can only be installed during assembly of such components, and cannot be installed under a wall-mounted tile or retrofitted into an existing joint after removal of the initial caulking seal therefrom. Also, if used at the rim of a tub or shower stall, where the weight of tub or shower occupants can tend to cause the tub or shower tray to sink over time, the upper lip of the molding may tend to pull away from the wall, thus defeating the seal between the wall and the tub or shower rim.

French patent application 2,724,438 teaches a moulding for use between a tub rim and a tub surround wall covering, where the top of the moulding is slotted to embrace upwardly around the bottom end of the wall covering on both sides thereof. The moulding thus must be installed at the same time as the wall covering, and the lower end of the wall covering is tilted out of plane form the rest of the wall covering.

Belgian Patent Application 641,869 teaches a moulding for use at the joint between a floor and upstanding wall, where the moulding has a base stem that sits under the bottom edge of the wall covering, and a cove shaped cap at the outer end of the stem to abut up against the wall covering. The moulding is not designed to provide a water tight seal.

Applicant has developed unique solution for the creation of water-tight corner joints between horizontal and upright structures, and which provides advantages over the aforementioned prior art.

SUMMARY OF THE INVENTION

According to a first aspect of the invention, in a corner joint between a generally horizontal structure and a generally vertical structure upstanding therefrom, there is provided a sealing arrangement comprising:

a moulding having a longitudinal dimension extending along the corner joint and a cross-sectional shape that is defined in planes perpendicular to said longitudinal dimension and that comprises a rectangular base portion lying in a gap between the generally horizontal structure and a finishing layer of the generally vertical structure, and a cap portion integrally attached to an end of the rectangular portion and residing outside said gap, the cap defining an upper lip in contact against an outer surface of the finishing layer of the vertical structure at a height above a topside of the rectangular portion and a lower lip jutting downwardly past an underside of the rectangular portion for contact against an upper surface of the generally horizontal structure;

double sided foam tape extending the longitudinal dimension of the moulding with an upper surface of the foam tape adhered to an underside of the rectangular portion of the moulding and a lower surface of the foam tape adhered to the upper surface of the generally horizontal structure; and a bead of caulking extending the longitudinal dimension of the moulding at an inner face of the upper lip below an upper tip thereof to form a flexible seal of the moulding to the finishing layer of the vertical structure above the rectangular portion.

The generally horizontal structure may be a bathtub rim, with the generally vertical structure being a wall structure upstanding from said bathtub rim.

Alternatively, the generally horizontal structure may be a shower tray rim, with the generally vertical structure being a wall structure upstanding from said shower tray rim.

As a further alternative, the generally horizontal structure may be a countertop, with the generally vertical structure being a backsplash.

The finishing layer of the generally vertical structure may be a surface tile layer of said structure.

Preferably the double sided foam tape is pressure sensitive.

Preferably the double sided foam tape is acrylic foam tape.

In the corner joint, preferably the double sided foam tape is provided only on the underside of the rectangular portion of the moulding, and the topside of the rectangular portion is free of any adhesive, including the double sided foam tape.

According to a second aspect of the invention there is provided a moulding for sealing together a generally horizontal structure and a finishing layer of a generally vertical structure upstanding therefrom at a corner joint between said structures, said moulding comprising:

an elongated body having a longitudinal dimension for extending along the corner joint and a cross-sectional shape that is defined in planes perpendicular to said longitudinal dimension and that comprises a rectangular base portion for insertion into a gap between the generally horizontal structure and the finishing layer of the generally vertical structure, and a cap portion integrally attached to an end of the rectangular portion to lie outside said gap, the cap defining an upper lip for contact against an outer surface of the finishing layer of the vertical structure at a height above a topside of the rectangular portion and a lower lip jutting downwardly past an underside of the rectangular portion for contact against an upper surface of the generally horizontal structure; and double sided foam tape extending the longitudinal dimension of the body with an upper surface of the foam tape adhered to an underside of the rectangular portion of the body and a lower surface of the foam tape adhered to the upper surface of the generally horizontal structure, the topside of the rectangular portion of the body being free of said double sided foam tape.

According to a third aspect of the invention there is provided a method of sealing together a generally horizontal structure and a finishing layer of a generally vertical structure upstanding therefrom at a corner joint between said structures, the method comprising:

obtaining a moulding having a longitudinal dimension and a cross-sectional shape that is defined in planes perpendicular to said longitudinal dimension and that comprises a rectangular base portion and a cap portion integrally attached to an end of the rectangular portion, the cap defining an upper lip at a height above a topside of the rectangular portion and a lower lip jutting downwardly past an underside of the rectangular portion and the rectangular portion having double sided foam tape adhered to the underside of said rectangular portion;

applying a bead of caulking in along an inner face of the cap portion below the upper lip thereof;

inserting the rectangular portion of the moulding into a gap between the horizontal structure and the finishing layer of the vertical structure at the corner joint, leaving the cap portion outside said gap with the inner face of the cap portion facing the generally vertical structure; and forcing the moulding downwardly to adhesively secure the underside of the rectangular portion of the moulding to an upper surface of the generally horizontal structure via the double sided foam tape in a position with the rectangular portion inserted far enough into the gap such that the upper lip of the cap portion is placed in contact against an outer surface of the finishing layer of the generally vertical structure, the lower lip is placed in contact against an upper surface of the generally horizontal structure, and the bead of caulking is sandwiched between the moulding and the finishing layer of the generally vertical structure.

According to a fourth aspect of the invention there is provided a method of producing a moulding for sealing together a generally horizontal structure and a finishing layer of a generally vertical structure upstanding therefrom at a corner joint between said structures, said method comprising:

providing an elongated body having a longitudinal dimension for extending along the corner joint and a cross-sectional shape that is defined in planes perpendicular to said longitudinal dimension and that comprises a rectangular base portion for insertion into a gap between the generally horizontal structure and the finishing layer of the generally vertical structure, and a cap portion integrally attached to an end of the rectangular portion to lie outside said gap, the cap defining an upper lip for contact against an outer surface of the finishing layer of the generally vertical structure at a height above a topside of the rectangular portion and a lower lip jutting downwardly past an underside of the rectangular portion for contact against an upper surface of the generally horizontal structure; and applying double sided foam tape in the longitudinal dimension of the body to only an underside of the rectangular portion of the body so that an upper surface of the foam tape adheres to the underside of the rectangular portion of the body and a lower surface of the foam tape is adherable to the upper surface of the generally horizontal structure during installation of the moulding.

According to a fifth aspect of the invention there is provided an edge trim for capping off an edge of an article, the edge trim comprising:

a moulding having an elongated body with a longitudinal dimension and a cross-sectional shape that is defined in planes perpendicular to said longitudinal dimension, the cross-sectional shape comprising a rectangular base portion and a cap portion integrally attached to an end of the rectangular portion, the cap defining a larger lip extending a first distance from a first side of the rectangular portion and a smaller lip jutting a shorter second distance from an opposing second of the rectangular portion for contact against an upper surface of the generally horizontal structure; and double sided foam tape extending the longitudinal dimension of the body with one surface of the foam tape adhered to the first side of the rectangular portion of the body for adherence of an opposing surface the foam tape to the edge of the article in a position placing an inner face of the larger lip against an edge-adjacent area of a face of the article in a plane perpendicular to the edge thereof.

According to a sixth aspect of the invention there is provided a method of preparing a moulding for use, the method comprising:

providing an elongated body having a longitudinal dimension and a cross-sectional shape that is defined in planes perpendicular to said longitudinal dimension and that comprises a rectangular base portion and a cap portion integrally attached to an end of the rectangular portion, the cap defining a first larger lip that extends a first distance to a first side of the rectangular portion and a smaller lip jutting a shorter second distance to a second side of the rectangular portion; and applying double sided foam tape in the longitudinal dimension of the body to only one of the first and second sides of the rectangular portion according to whether the moulding is to be used in forming a water-tight joint between two structures or used in capping off an edge of an article.

The present invention may include embodiments in which the moulding has a durometer hardness greater than 75 D, and embodiments having a durometer hardness greater than 80 D.

BRIEF DESCRIPTION OF THE DRAWINGS

In the accompanying drawings, which illustrate exemplary embodiments of the present invention:

FIG. 7 is a partial cross-sectional view of the tile installation of FIG. 6 as taken along line A-A thereof.

DETAILED DESCRIPTION

Figure 1:
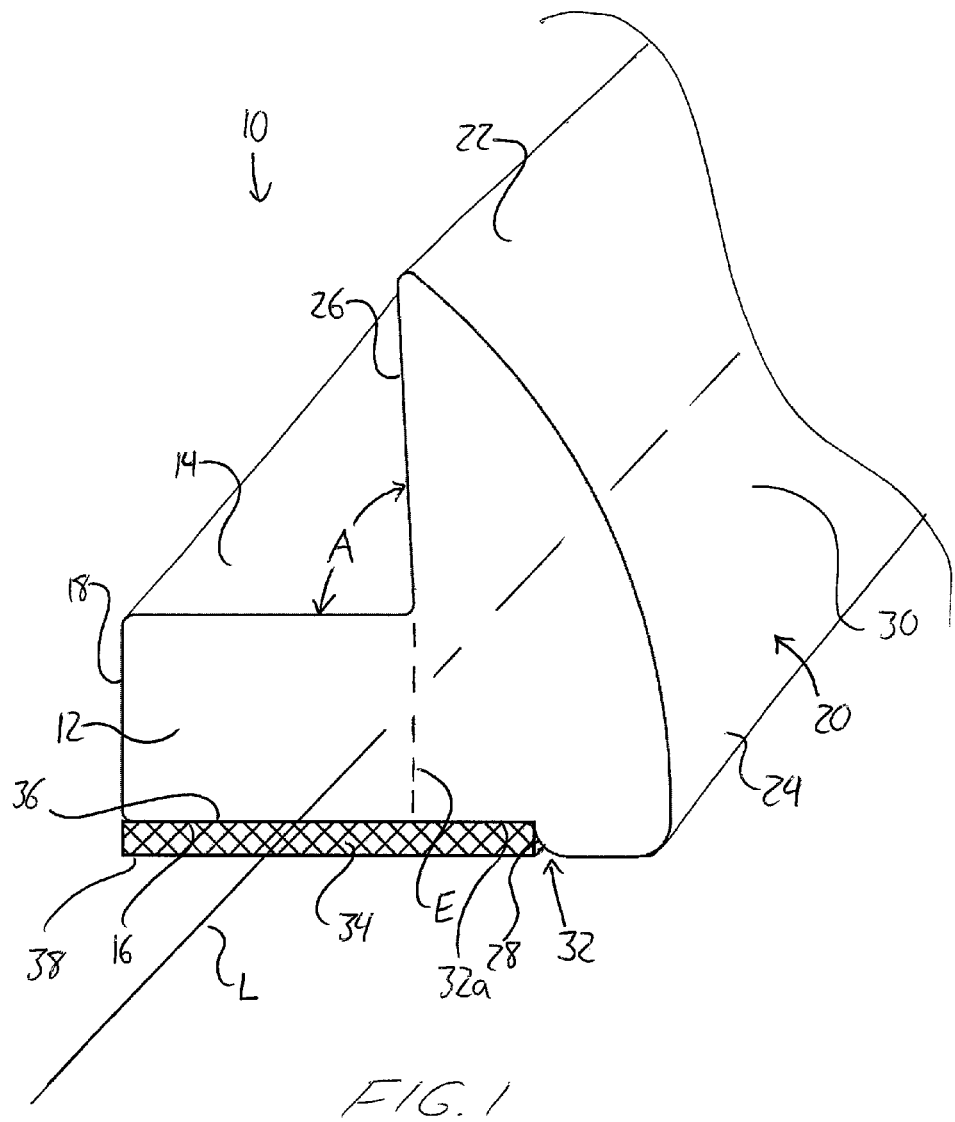
FIG. 1 is a perspective end view of a deformable moulding used in a water tight corner joint of the present invention.
Figure 4:
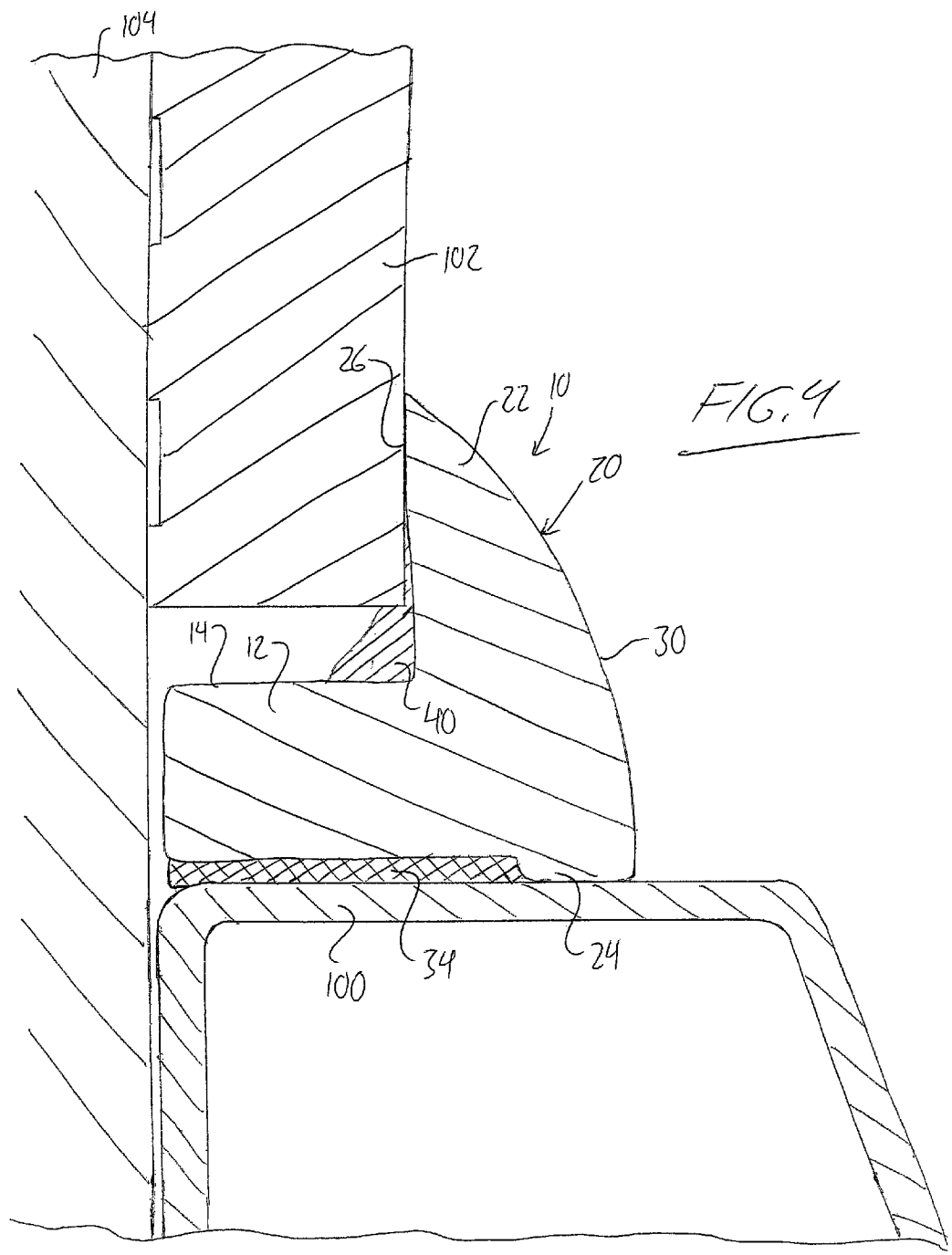
FIG. 4 is a cross-section view of the deformable moulding and caulking of FIGS. 2 and 3 once installed in the corner joint.
Figure 5:
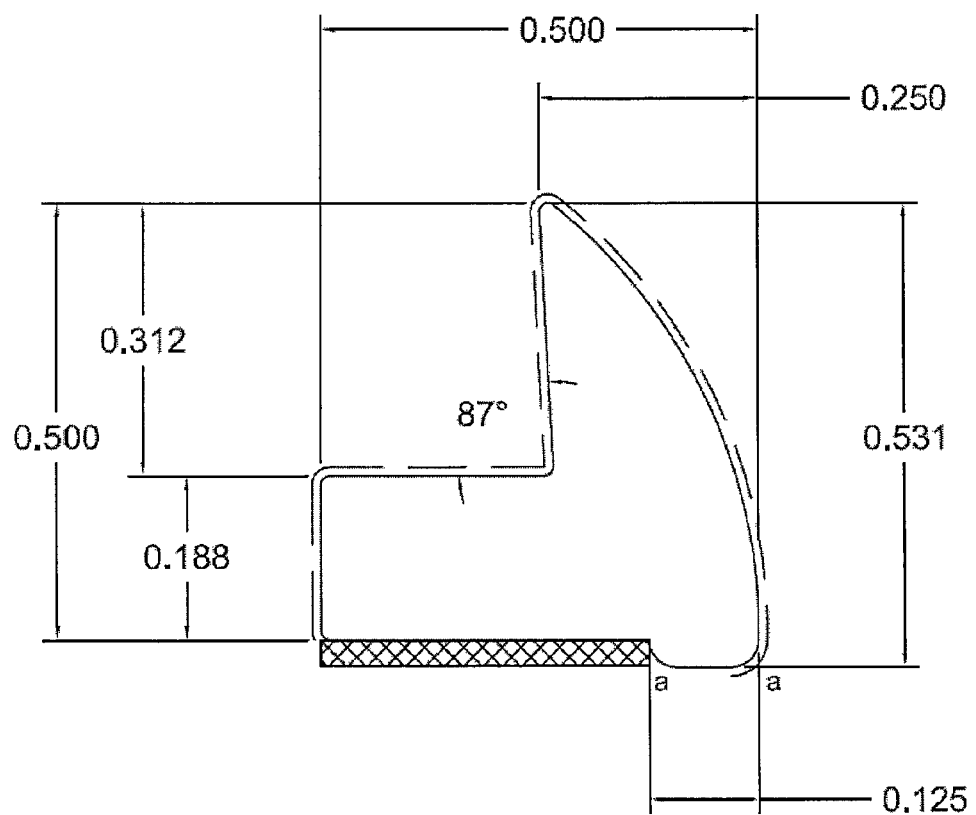
FIG. 5 is an end view of the deformable moulding showing possible dimensions for same according to one example of the present invention.

FIG. 1 shows a moulding 10 formed by extrusion of polyvinyl chloride (PVC), and having some similarities in shape to the PVC moulding shown in FIGS. 4 and 5 of aforementioned U.S. Pat. No. 4,760,681, the entirety of which is incorporated herein by reference.

The cross-sectional shape of the moulding in planes normal to its longitudinal axis L features a rectangular stem or base 12 having a topside 14, an underside 16, and a free inside end 18. Integrally attached to the opposing end of the rectangular stem or base 12, which is shown in broken lines at E, is a sealing cap 20 having a larger upper lip 22 that projects a notable distance upward from the base stem 12, and a smaller lower lip 24 that juts a shorter distance downward from the base stem 12. The moulding of the illustrated embodiment features a unitary body that defines the rectangular base stem and the cap as seamlessly integral parts of a whole. The illustrated embodiment of the moulding features a uniform material composition throughout, but co-extruded embodiments employing material variations in different layers or portions are contemplated within the scope of the present invention.

An inner face 26 of the upper lip 22 faces back over the base stem 12 and forms a slightly acute angle A, for example approximately 87-degrees, with the flat topside of the base stem 12. An inner face 28 of the lower lip 24 initially forms a right angle with the flat underside of the base stem 12, then transitions into an underside of the lower lip through a curved corner. An outer face 30 of the cap 20 convexly joins a top end of the inner face 26 of the upper 22 lip to an underside 32 of the lower lip 24, giving the cap a shape that widens from a point-like tip at the top of the upper lip down to the wider lower lip. In the illustrated embodiment, the underside of the lower lip 24 has a stepped configuration, initially forming a flush continuation of the underside of the rectangular base stem 12, before stepping downward therefrom to form the downwardly jutting extent of the lower lip at an outer portion thereof adjacent the outer face.

Double sided foam tape 34 features adhesive at both its upper and lower surfaces 36, 38, and the upper surface 36 of the tape 34 is adhered to the underside 16 of the base stem 12 of the moulding 10 over the length thereof. In the illustrated embodiment, where the underside 32 of the lower lip 24 has a stepped configuration, the width of the tape 34 is sufficient to fully span the combined width of the underside 16 of the base stem 12 and the raised portion 32a of the lower lip's underside that lies flush with the underside of the base stem 12. Unlike the moulding of U.S. Pat. No. 4,760,681, the topside 14 of the base stem 12 is free of any such tape or other adhesive. The adhesive lower surface 36 of the tape 34 is preferably initially concealed and protected by a suitable strip of covering material (not shown), which is subsequently removed to prepare the moulding for installation in the manner described below.

As an example of a suitable tape, prototypes of the present invention have employed VHB™ RP45(F) tape from the RP series of VHB tapes commercially available from the 3M Company of St. Paul Minn. The selected tape is a double sided, pressure sensitive, acrylic foam tape with a 0.045-inch thickness and a film-liner, although VHB tapes of other thicknesses and liner materials would likewise be suitable for use within the context of the present invention, as would tapes of comparable properties and performance, whether from 3M or other manufacturers. VHB tapes are marketed as being suitable for waterproofing applications, providing a permanent bond for sealing against water and other environmental elements.

Figure 2:
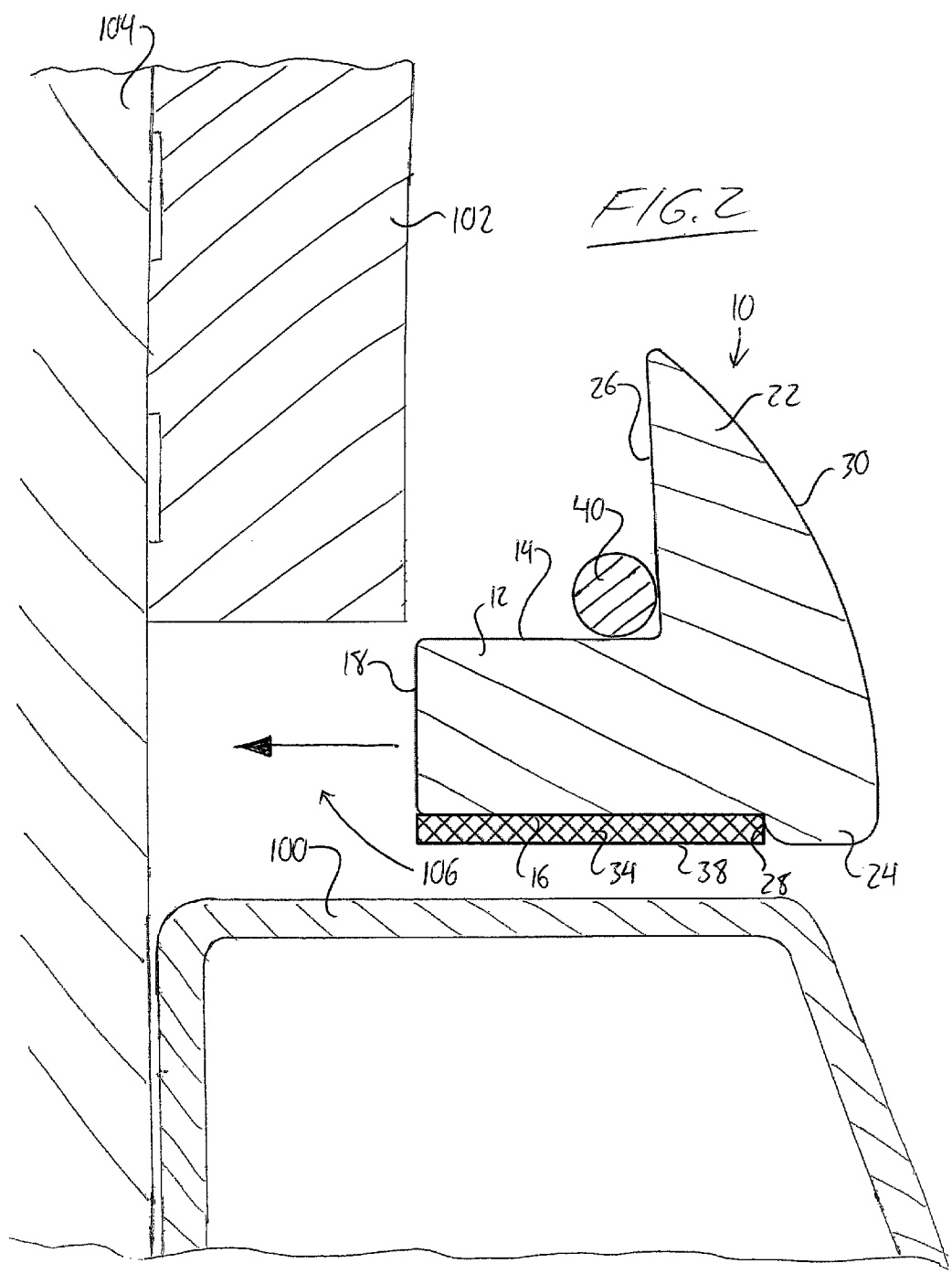
FIG. 2 is a cross-sectional view of the deformable moulding of FIG. 1 with a bead of caulking applied thereto prior to installation of the moulding at a corner joint between a bathtub rim and a tiled wall adjacent the same.
Figure 3:
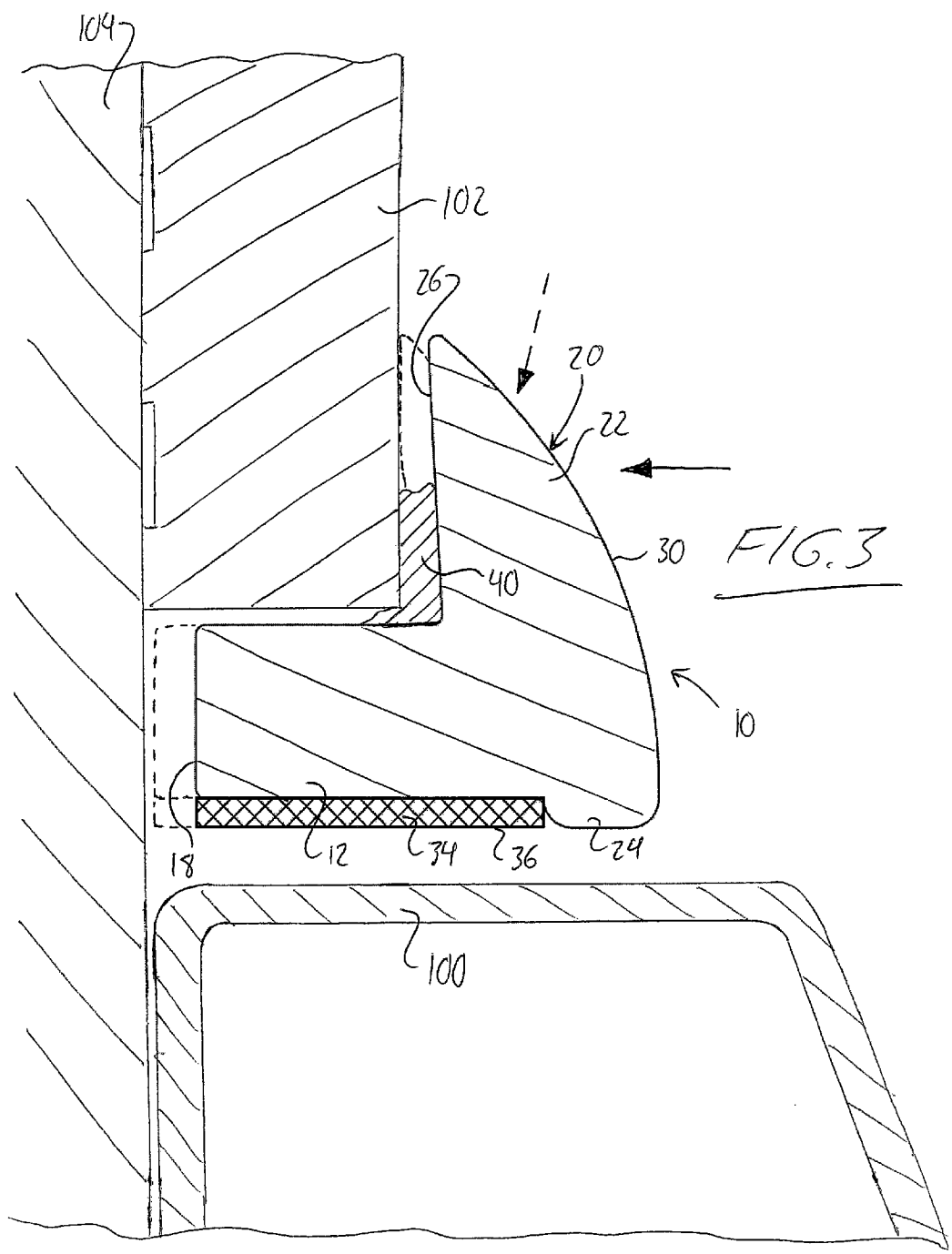
FIG. 3 is a cross-sectional view of the deformable moulding and caulking of FIG. 2 during installation at the corner joint.

The process of installing the moulding, and the resulting seal formed by the same, is illustrated in FIGS. 2 through 4, where the moulding is used at a horizontal corner joint formed between the generally horizontal surface 100 of a bathtub rim extending around the perimeter of the tub interior at the top of the tub walls, and the generally vertical surface of a layer of wall tiles 102 installed on an upright wall 104 against which the tub has been installed. FIG. 2 shows the existence of a small gap 106 between the bottom edge of the lowermost row of tiles 102 and the upper horizontal surface of the tub rim 100.

Conventionally, attempted water proofing of this gap to prevent water penetration to the wall layers behind the surface tiles 102 has been performed by the application of silicone or other caulking material. However, it can be difficult to obtain a fully tight waterproof seal over the full length of the joint using caulking alone, especially since grout lines in the surface tiling layer make the overall outer surface of the wall non-planar, as the grout between the tiles is recessed somewhat back from the exposed outer faces of the tiles. The following process forms an improved seal at a tub and wall-tile joint, or other horizontal corner joint at which water exposure is expected.

Still referring to FIG. 2, to prepare the moulding for installation, a bead of silicone 40 or other caulking material is applied along the length of the moulding 10 at the inner face 26 of the upper lip 20 of the moulding 10, for example at the acute-angle corner defined between this face 26 and the top surface 14 of the base stem 12 of the moulding 10. Before or immediately after the application of the caulking to the moulding 10, the protective cover strip (not shown) is removed from the bottom surface 38 of the foam tape 34.

As shown in FIG. 2, the gap 106 between the tub surface and bottom tile edge has a height slightly exceeding the height or thickness of the base stem 12 of the moulding 10. The base stem 12 of the moulding 10, and the foam tape attached to the underside thereof, is inserted into the gap 106 with the topside of the base stem 12 closely adjacent the bottom edge of the tiles 102 so as to keep the exposed adhesive at the bottom surface of the foam tape distanced from the tub surface during this insertion. Pressure sensitive adhesive may be used so that inadvertent low-pressure contact of the foam tape against the tub surface during the insertion process will not form an excessive bond to the tub surface, and will allow separation of the moulding therefrom to allow lifting and continued insertion of the moulding, or removal and reinsertion thereof, to ensure sufficient insertion of the moulding into the gap before adhesion of the moulding to the tub.

Turning to FIG. 3, insertion of the base stem 12 of the moulding into the gap 106 continues, as shown in solid lines, until an upper portion of the inner face 26 of upper lip 22 is abutted and deformed flat against the outer surface 102a of the tile layer 102 of the wall. At this point, as shown in broken lines, the moulding 10 is then pressed downward to force the adhesive at the bottom surface 38 of the foam tape 34 against the horizontal tub surface 100. As shown in FIG. 4, the moulding 10 is thus held in place with the upper portion of the rear face of the upper lip in sealed contact against the tile surface 102a, thus forming a liquid tight seal therewith. The resiliency of the moulding material maintains pressured contact of the inner face of the upper lip against the tile to retain this water tight condition. The adherence of the underside of the base stem of the moulding to the tub surface by the foam tape likewise holds the lowermost extent of the lower lip of the moulding in pressured contact against the tub surface to create a water tight seal therewith.

A secondary water tight seal between the upper lip of the moulding and the wall tile is accomplished by the silicone caulking 40 now sandwiched between the moulding and the tile. The caulking ensures a proper seal between the moulding and the slight recessing of the surface tile layer of the wall at the vertical grout lines between the tiles, as the forcing of the upper lip of the moulding against the tiles during installation squeezes the caulking into any available space between the grout lines and the inner face of the moulding's upper lip. Accordingly, although the point-like tip at the top of the upper lip may be thin enough in some embodiments to have sufficient flexibility to conform completely against a recessed grout line, even if a complete water-tight seal of the upper lip of the moulding against the wall structure is not achieved at the grout lines, the caulking sandwiched between the moulding and the tile and grout surface layer of the wall structure seals the wall and moulding together over the full length thereof.

The foam tape adhesive provides a strong enough bond to the tub surface to hold the moulding water tight contact against the tub and tile, while the caulking provides a further flexible water tight seal between the moulding and the tile. This way, some relative movement between the tub and the wall, as may occur when the tub is subjected to the weight of occupants, is accommodated by the flexibility of the caulking without detriment to the water tightness of the seals.

It will be appreciated that the forgoing solution for sealing together two structures at a moisture-exposed corner joint may be employed for applications other than tub-to-tile situations. For example, the rim of a shower floor tray may be likewise sealed to a tile wall in such a manner, or the moulding may be used between a countertop and a tiled wall or backsplash. Although offering particular advantage in the context of tile-finished structures, the same solution may be used for other surfaces, whether purely planar, or otherwise. For wall finishes that are purely planar (with no groutlines, or surface texture or irregularities), the double seal provided by the upper lip and the caulking nevertheless adds a higher degree of water tight confidence, where the caulking provides a failsafe seal in case the upper lip should somehow be pried away from the wall surface.

FIG. 5 shows dimensions in which the moulding described above may be produced, although other dimensions and angles may be employed without departing from the scope of the present invention.

While the forgoing embodiment includes a resilient deformability of the moulding in cross-sectional planes perpendicular to its length so that the upper and lower lips will pliably conform against the surfaces of the structures to provide a fluid-tight seal with the same, other embodiments may have a greater hardness with a more stiff or rigid cross-sectional shape, while still preferably being deformable in length so as to be able to closely follow the form of the wall or other vertical structure at which the moulding is used, as it is well known that walls will typically deviate somewhat form a perfectly planar form.

Such embodiments share several beneficial features with more the more flexible embodiment outlined above, including that the upper and lower lips of the moulding's cross-sectional shape are still placed in contact with the vertical and horizontal structures to conceal the caulking and tape, respectively, from sight, and to prevent or limit exposure of the same to water. The combination of the tape and the caulking again allows for a degree of flexing between the two structures while maintaining a water tight seal with both. Even if the greater rigidity of the upper lip means that variations in the upright surface of the vertical structure introduce small water-accessible gaps, the overall exposure of the caulking to water is still drastically reduced compared to conventional use of caulking alone, and the PVC material of the moulding is not prone to mold or other water damage. Accordingly, the overall opportunity for mold formation is reduced or eliminated, and visible face of the joint is unsusceptible to mold growth.

As non-limiting examples of suitable materials, the extruded moulding of the present invention may be made of Geon™ Vinyl Dry Blend E7456 rigid polyvinyl chloride or Geon™ Vinyl Rigid Extrusion 87416 rigid polyvinal chloride, both available from PolyOne Corporation of Avon Lake Ohio and each having a durometer hardness of 82 on the Shore D scale. These materials are High impact, gloss, UV, chemical resistant, window grade PVC materials, that are very weather, mildew, mold, and chemical resistant compounds. While it is possible that mold can grow on this compound, it will not seep into, saturate, or stain the material. Any accumulation can be thoroughly removed simply by disinfecting and wiping off the material to remove mold, mildew etc. The material can be used with household cleaners such as Mr. Clean™, Windex™, Lysol™ etc, without harming the material characteristics. The material is thus not prone to the mold penetration and staining issues faced by conventional use of caulking alone, where once mold buildup has occurred, the buildup can be difficult to remove, and tends to leave behind remnants or stains.

Figure 6:
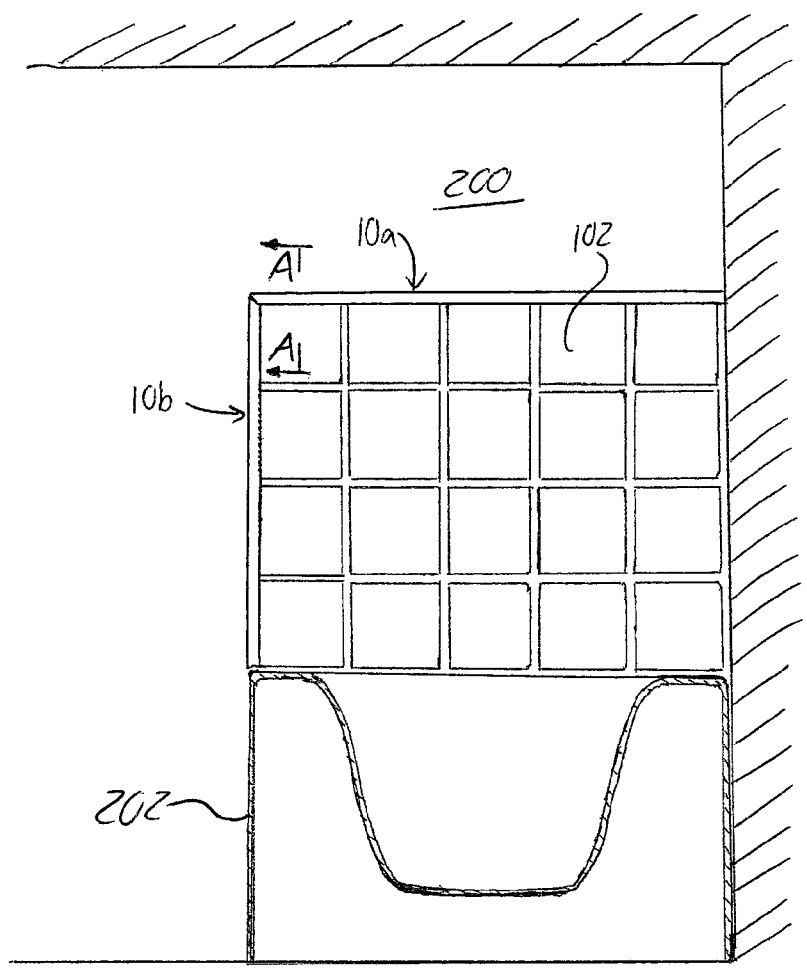
FIG. 6 is an elevational view of a tile installation showing use of a moulding similar to that of FIG. 1 as trim for capping off exposed edges of the tile installation.

The same moulding 10 used in the above described water tight joint between two structures can also be used as edging trim for tile, other thin wall coverings, or other articles. For example, FIG. 6 shows a partially tiled wall 200 with an array of wall tiles 102 mounted thereon over a partial height and partial width of the wall, for example to form one side of a tiled bathtub surround at areas of the bathroom walls that reside over the bathtub 202. The partially tiled wall is preferably sealed to the tub in the manner described above with reference to the other figures, but then additional pieces of moulding 10a, 10b are used as trim along edges of the tiles 102 at the exposed top and side edges of the tiled area. In such an instance, where the trim is installed along more than one intersecting edges, the pieces can be mitre cut to fit flush together at the corner between these edges.

FIG. 7 illustrates how the moulding can be used for such edge-finishing purposes. The double sided foam tape 34 is applied to the opposite surface of the rectangular base stem 12 compared to the other illustrated embodiment. That is, the tape 34 is applied to the rectangular base stem 12 on the side thereof that faces toward the larger lip 22 that is placed against the exposed outer faces of the tiles. This taped side of the rectangular base stem 12 is pressed against the exposed edge of the tile so as to adhere the moulding to the tile in a position placing the free end 18 of the rectangular base stem 12 in abutment against, or close proximity to, the untiled wall surface surrounding the tiled area of the wall 200, and placing the inner face 26 of the larger lip 22 against the exposed outer face of the tile in a plane perpendicular to the tile edge.

Although the orientation of moulding 10a in FIG. 7 is inverted relative to the moulding 10 of FIGS. 1 through 5, this is only because the moulding is being used to trim the top edge of a wall-mounted array of tiles, instead of being used to seal the bottom edge of the array of tiles to an underlying bathtub. The orientation of the moulding relative to the tile edge is actually the same in the edge-trimming application of FIG. 7 as for the water-tight corner joint embodiment of FIGS. 1 to 5. The installation differs in that the rectangular base stem of the moulding is taped to the tile, not to another structure, and no caulking is required if the moulding is being used only as ornamental trim, and not to form a water tight seal. However, the bead of caulking described for the water-tight joint application may included in the edge-capping application if desired. The same moulding product can thus be used for different applications, simply by switching the side of the rectangular base stem to which the double sided foam tape is applied.

The manufacturer thus may achieve two distinct products through production of a single moulding line, simply be applying the tape to different sides of the base stem of the moulding. Alternatively, the manufacturer may sell the moulding to consumers and provide instructions for both watertight joint applications and edge trimming applications, whereby the installer applies manufacturer included doubles sided tape to the appropriate area according to the particular task at hand. The double sided tape may be provided by the moulding manufacturer or seller, or be purchased separately by the consumer, who may or may not be the installer. However, application of the tape by the manufacturer under carefully controlled conditions may better ensure a thorough, water tight bond between the tape and the moulding for better quality control over the final assembled product.

Although FIGS. 6 and 7 outline use of the moulding to edge-capping trim for wall-mounted tiles, it will be appreciated that the moulding may likewise be used to cap the edges of other articles. Examples of possible applications include tile capping, floor coving, window/door case trimming, kitchen/bath counter backsplash sealing, cabinet edging and trimming, or any other tile end application.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. In a corner joint between a generally horizontal structure and a generally vertical structure upstanding therefrom, a sealing arrangement comprising:
    a moulding having a longitudinal dimension extending along the corner joint and a cross-sectional shape that is defined in planes perpendicular to said longitudinal dimension and that comprises a rectangular base portion lying in a gap between the generally horizontal structure and a bottom edge of a finishing layer of the generally vertical structure, and a cap portion integrally attached to an end of the rectangular portion and residing outside said gap, the cap defining an upper lip in contact against an outer surface of the finishing layer of the vertical structure at a height above a topside of the rectangular portion and a lower lip jutting downwardly past an underside of the rectangular portion for contact against an upper surface of the generally horizontal structure;
    double sided foam tape extending the longitudinal dimension of the moulding with an upper surface of the foam tape adhered to an underside of the rectangular portion of the moulding and a lower surface of the foam tape adhered to the upper surface of the generally horizontal structure; and
    a bead of caulking extending the longitudinal dimension of the moulding at an inner face of the upper lip below an upper tip thereof and forming a flexible seal between the inner face of the moulding and the outer surface of the finishing layer of the vertical structure at a location above the rectangular portion of the moulding.

2. The corner joint of claim 1 wherein the generally horizontal wall structure is a bathtub rim and the generally vertical structure is a wall structure upstanding from said bathtub rim.

3. The corner joint of claim 1 wherein the generally horizontal wall structure is a shower tray rim and the generally vertical structure is a wall structure upstanding from said shower tray rim.

4. The corner joint of claim 1 wherein the generally horizontal structure is a countertop and the generally vertical structure is a backsplash upstanding from said countertop.

5. The corner joint of claim 1 wherein the outer finishing layer of the generally vertical structure is a surface tile layer of said structure, and the bead of caulking fills in vertical grout lines of said surface tile layer at the outer surface of the surface tile layer.

6. The corner joint of claim 1 wherein the double sided foam tape is pressure sensitive.

7. The corner joint of claim 1 wherein the double sided foam tape is acrylic foam tape.

8. The corner joint of claim 1 wherein said double sided foam tape is provided only on the underside of the rectangular portion of the moulding.

9. The corner joint of claim 1 wherein the topside of the rectangular portion is free of any double sided foam tape.

10. A method of sealing together a generally horizontal structure and a finishing layer of a generally vertical structure upstanding therefrom at a corner joint between said structures, the method comprising:
    (a) obtaining a moulding having a longitudinal dimension and a cross-sectional shape that is defined in planes perpendicular to said longitudinal dimension and that comprises a rectangular base portion and a cap portion integrally attached to an end of the rectangular portion, the cap defining an upper lip at a height above a topside of the rectangular portion and a lower lip jutting downwardly past an underside of the rectangular portion and the rectangular portion having double sided foam tape adhered to the underside of said rectangular portion;
    (b) applying a bead of caulking in along an inner face of the cap portion below the upper lip thereof;
    (c) inserting the rectangular portion of the moulding into a gap between the horizontal structure and the finishing layer of the vertical structure at the corner joint, leaving the cap portion outside said gap with the inner face of the cap portion facing the generally vertical structure; and
    (d) forcing the moulding downwardly to adhesively secure the underside of the rectangular portion of the moulding to an upper surface of the generally horizontal structure via the double sided foam tape in a position with the rectangular portion inserted far enough into the gap such that the upper lip of the cap portion is placed in contact against an outer surface of the finishing layer of the generally vertical structure, the lower lip is placed in contact against an upper surface of the generally horizontal structure, and the bead of caulking is sandwiched between the inner face of the moulding and the outer surface of the finishing layer of the generally vertical structure.

11. The method of claim 10 wherein the generally horizontal wall structure is a bathtub rim and the generally vertical structure is a wall structure upstanding from said bathtub rim.

12. The method of claim 10 wherein the generally horizontal wall structure is a shower tray rim and the generally vertical structure is a wall structure upstanding from said shower tray rim.

13. The method of claim 10 wherein the generally horizontal structure is a countertop and the generally vertical structure is a backsplash upstanding from said countertop.

14. The method of claim 10 wherein the outer surface of the generally vertical structure is defined by a surface tile layer of said structure, and step (d) comprises, while forcing the moulding downwardly into place, forcing the moulding against the outer surface of the tile layer thereby squeezing the caulking into vertical grout lines of said surface tile layer at the outer surface thereof.

15. The method of claim 10 wherein the double sided foam tape is pressure sensitive.

16. The method of claim 10 wherein the double sided foam tape is acrylic foam tape.

17. The method of claim 10 wherein said double sided foam tape is provided only on the underside of the rectangular portion of the moulding.

18. The method of claim 10 wherein the topside of the rectangular portion is free of any double sided foam tape.

\* \* \* \* \*